United States Patent
Kwon

(10) Patent No.: US 11,910,466 B2
(45) Date of Patent: *Feb. 20, 2024

(54) METHOD AND APPARATUS FOR OPERATING OF NETWORK AND USER EQUIPMENT SUPPORTING MOBILITY OF USER EQUIPMENT IN WIRELESS COMMUNICATION SYSTEM

(71) Applicant: Innovative Technology Lab Co., Ltd., Seoul (KR)

(72) Inventor: Ki Bum Kwon, Seoul (KR)

(73) Assignee: INNOVATIVE TECHNOLOGY LAB CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,689

(22) Filed: Apr. 25, 2022

(65) Prior Publication Data
US 2022/0256641 A1  Aug. 11, 2022

Related U.S. Application Data

(63) Continuation of application No. 16/483,159, filed as application No. PCT/KR2018/001425 on Feb. 2, 2018, now Pat. No. 11,357,070.

(30) Foreign Application Priority Data

Feb. 3, 2017  (KR) .................. 10-2017-0015730

(51) Int. Cl.
*H04W 76/27*  (2018.01)
*H04W 8/02*   (2009.01)
(Continued)

(52) U.S. Cl.
CPC ............ *H04W 76/27* (2018.02); *H04W 8/02* (2013.01); *H04W 68/005* (2013.01); *H04W 36/32* (2013.01)

(58) Field of Classification Search
CPC ..... H04W 76/27; H04W 8/02; H04W 68/005; H04W 36/32; H04W 68/02; H04W 36/08;
(Continued)

(56) References Cited

U.S. PATENT DOCUMENTS

2003/0040313 A1  2/2003 Hogan et al.
2008/0218209 A1  9/2008 Lee et al.
(Continued)

FOREIGN PATENT DOCUMENTS

WO  2016-105570 A1  6/2016

OTHER PUBLICATIONS

LG Electronics Inc., "UE controlled mobility in RRC_Inactive", 3GPP TSG-RAN WG2 NR Ad Hoc, R2-1700451, Spokane, USA, Jan. 17-19, 2017, pp. 1-3.
(Continued)

*Primary Examiner* — Ivan O Latorre

(57) ABSTRACT

A wireless user device comprises at least one antenna, at least one processor, and memory storing instructions that cause the wireless user device to: receive first radio access network-based notification area (RNA) information, wherein the wireless user device is in a radio resource control (RRC) inactive mode; receive, from a base station, second RNA information different from the first RNA information, and an access barring threshold value, based on a difference between the first RNA information and the second RNA information and based on the access barring threshold value, determine that an RNA update indication is allowed, transmit, to the base station and based on determining that the RNA update indication is allowed, an RNA update indication message, receive an RNA update reject message responsive to the RNA update indication message, and after receiving the RNA update reject message and while a timer is running, start a cell reselection.

18 Claims, 9 Drawing Sheets

(51) Int. Cl.
*H04W 68/00* (2009.01)
*H04W 36/32* (2009.01)

(58) Field of Classification Search
CPC . H04W 36/0033; H04W 48/12; H04W 48/20; H04W 60/04
See application file for complete search history.

(56) References Cited

U.S. PATENT DOCUMENTS

| | | | |
|---|---|---|---|
| 2013/0324118 A1 | 12/2013 | Iwamura et al. |
| 2015/0156692 A1 | 6/2015 | Kim et al. |
| 2015/0305056 A1 | 10/2015 | Vangala et al. |
| 2017/0265133 A1 | 9/2017 | Chandramouli et al. |
| 2018/0167883 A1 | 6/2018 | Guo et al. |
| 2018/0176834 A1 | 6/2018 | Wei et al. |
| 2018/0255520 A1 | 9/2018 | Park |
| 2019/0098546 A1 | 3/2019 | Cha et al. |
| 2019/0159278 A1 | 5/2019 | Takahashi et al. |
| 2019/0191483 A1 | 6/2019 | Ryoo et al. |
| 2019/0239188 A1 | 8/2019 | Wang et al. |
| 2019/0246342 A1 | 8/2019 | Wang et al. |
| 2019/0342804 A1 | 11/2019 | Futaki et al. |
| 2020/0059884 A1 | 2/2020 | Chen et al. |
| 2020/0163148 A1 | 5/2020 | Futaki et al. |

OTHER PUBLICATIONS

NEC, "Cell reselection crossing RAN notification area boundary", 3GPP TSG-RAN WG2 #NR Ad Hoc, R2-1700593, Spokane, USA, Jan. 17-19, 2017, pp. 1-3.

LG Electronics Inc., "RAN Notification Area in RRC_Inactive", 3GPP TSG-RAN WG2 NR Ad Hoc, R2-1700446, Spokane, USA, Jan. 17-19, 2017, pp. 1-3.

Huawei et al., "UL data transmission in RRC_Inactive", 3GPP TSG-RAN WG2 #96, Nov. 2016, 8 Pages (Year: 2016).

Ericsson, "Baseline solution for small data transmission in RRC_Inactive", 3GPP TSG-RAN WG2 #96, Nov. 2016, 7 Pages (Year: 2016).

METHOD AND APPARATUS FOR OPERATING OF NETWORK AND USER EQUIPMENT SUPPORTING MOBILITY OF USER EQUIPMENT IN WIRELESS COMMUNICATION SYSTEM

CROSS-REFERENCE TO RELATED APPLICATIONS

This application is a continuation of U.S. application Ser. No. 16/483,159, filed on Oct. 24, 2019, which is the National Stage Entry of PCT International Application No. PCT/KR2018/001425, filed on Feb. 2, 2018, which claims priority from and the benefit of Korean Patent Application No. 10-2017-0015730, filed on Feb. 3, 2017, each of which is hereby incorporated by reference in its entirety.

TECHNICAL FIELD

The present disclosure relates to a wireless communication system, and more particularly, to a method and apparatus for supporting a mobility of a user equipment (UE).

RELATED ART

Various radio resource control (RRC) modes may be set in a network connection of a user equipment (UE). In a current wireless communication system, an RRC connected mode and an RRC idle mode are defined. Further, in a next wireless communication system, there is an ongoing discussion regarding defining a new RRC mode to support a case in which load of a communication service required by a UE is low or absent.

However, a method of supporting a mobility of a UE set to be in a new RRC mode is not provided so far.

DETAILED DESCRIPTION

Technical Subject

An aspect of the present disclosure provides a method and apparatus for supporting a mobility of a user equipment (UE) set to be in a newly defined radio resource control (RRC) mode.

Another aspect of the present disclosure provides a method and apparatus for defining a new area to manage a mobility of a UE and accordingly, updating an area to which the UE belongs.

Still another aspect of the present disclosure provides an effective area update method and apparatus for minimizing signaling load to support a UE set to be in a newly defined RRC mode to migrate between newly defined areas.

Technical subjects to be implemented in the present disclosure are not limited to the aforementioned technical subjects and other technical subjects not described herein can be understood by a person of ordinary skill in the art from the following description.

Technical Solution

An aspect of the present disclosure provides a method and apparatus for supporting a mobility of a user equipment (UE) set to be in a newly defined radio resource control (RRC) mode.

Another aspect of the present disclosure provides a method and apparatus for defining a new area to manage a mobility of a UE and accordingly, updating an area to which the UE belongs.

Still another aspect of the present disclosure provides an effective area update method and apparatus for minimizing signaling load to support a UE set to be in a newly defined RRC mode to migrate between newly defined areas.

Technical subjects to be implemented in the present disclosure are not limited to the aforementioned technical subjects and other technical subjects not described herein can be understood by a person of ordinary skill in the art from the following description.

Effects

According to the present disclosure, there may be provided a method and apparatus for supporting a mobility of a user equipment (UE) set to be in a newly defined radio resource control (RRC) mode.

According to the present disclosure, there may be provided a method and apparatus for defining a new area to manage a mobility of a UE and accordingly, updating an area to which the UE belongs.

According to the present disclosure, there may be provided an effective area update method and apparatus for minimizing signaling load to support a UE set to be in a newly defined RRC mode to migrate between newly defined areas.

Effects acquirable from the present disclosure are not limited to the aforementioned effects and other effects not described herein can be understood by a person of ordinary skill in the art from the following description.

MODE

Figure 1:
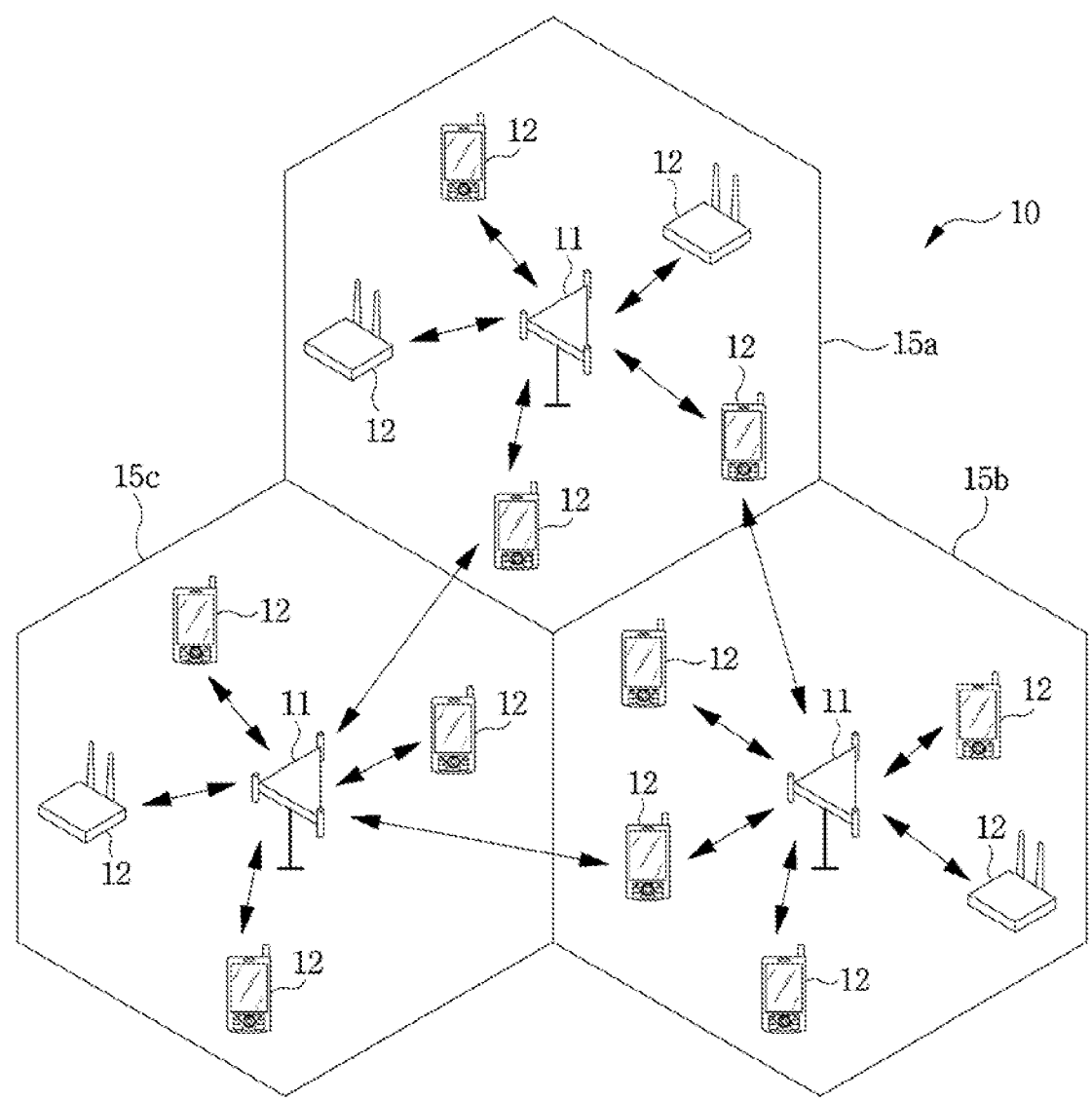
FIG. 1 illustrates a wireless communication system according to the present disclosure.

Hereinafter, example embodiments of the present disclosure are described with reference to the accompanying drawings to be easily implemented by one of ordinary skilled in the art. However, the present disclosure may be embodied in various and different forms and are no construed as being limited to the example embodiment described herein.

In the description of the example embodiments, detailed description of well-known related structures or functions will be omitted when it is deemed that such description will cause ambiguous interpretation of the present disclosure. In addition, a portion irrelevant to the description about the present disclosure is omitted and like reference numerals refer to like elements in the drawings.

Throughout the specification, when a component is described as being "connected to", "coupled to", or "joined to" another component, it may be directly "connected to the other component" or there may be another component intervening therebetween. Also, when a component "comprises/includes" or "has" another component, it indicates that another component is further includable instead of excluding the other component, unless otherwise defined herein.

The terms, first, second, etc., are used only to distinguish one component from another component, and does not limit sequence or importance between components unless specially defined herein. Accordingly, within the scope of the present disclosure, a first component in one example embodiment may be referred to as a second component in another example embodiment. Likewise, a second component in one example embodiment may be referred to as a first component in another example embodiment.

In the present disclosure, mutually distinguishable components are used to clearly explain the respective features and are not intended to be necessarily separate. That is, a plurality of components may be integrated into a single hardware or software unit. A single component may be distributed over a plurality of hardware or software units. Accordingly, although not specially described, such integrated or distributed example embodiment is included in the scope of the present disclosure.

In the present disclosure, components described in various example embodiments may not be necessarily essential components and a portion of the components may be selective components. Accordingly, an example embodiment including a partial set of components described in one example embodiment is included in the scope of the present disclosure. Also, even an example embodiment additionally including other components in addition to components explained in various example embodiments is included in the scope of the present disclosure.

Also, herein, description is made based on a wireless communication network and an operation performed in the wireless communication network may be performed in such a manner that a system, for example, a base station in charge of the corresponding wireless communication network controls the network and transmits data, or may be performed by a UE coupled to the corresponding wireless network.

That is, various operations performed for communication with a UE in a network including a plurality of network nodes, including a base station, may be performed by the base station or other network nodes aside from the base station. Here, the term "base station (BS)" may be interchangeably used with a term, for example, a fixed station, a node B, allodeB (eNB), and an access point (AP). Also, the term "terminal" may be interchangeably used with a term, for example, a user equipment (UE), a mobile station (MS), a mobile subscriber station (MSS), a subscriber station (SS), and a non-AP station (STA).

FIG. 1 illustrates a wireless communication system according to the present disclosure.

A network topology of FIG. 1 may be a structure of a 5th generation (5G) mobile communication network. The 5G mobile communication network may include a network topology of an Evolved-Universal Mobile Telecommunications System (E-UMTS). The E-UMTS system may include Long Term Evolution (LTE), LTE-Advanced (LTE-A), an LTE-A pro-system, and an evolved-LTE system. Also, the 5G mobile communication network may include a 5G system and a new radio (NR) system.

Referring to FIG. 1, in a wireless communication system 10, a base station (BS) 11 and a user equipment (UE) 12 may transmit and receive data in a wireless manner. Also, the wireless communication system 10 may support device-to-device (D2D) communication. The D2D communication in the wireless communication system is further described below.

In the wireless communication system 10, the BS 11 may provide a communication service to the UE present in coverage of the BS through a specific frequency band. The coverage serviced by the BS may be represented as a site. The site may include a plurality of areas 15a, 15b, and 15c, each referable as a sector. Each sector included in the site may be identified based on a different identifier. Each of the sectors 15a, 15b, and 15c may be understood as a partial area that is covered by the BS 11.

In general, the BS 11 refers to a station with which the UE 12 communicates, and may be interchangeably used with other terms, for example, an evolved-NodeB (eNodeB), g-NodeB or 5G-NodeB (gNB), a base transceiver system (BTS), an access point (AP), a femto eNodeB, a home eNodeB (HeNodeB), a relay, and a remote radio head (RRH).

The UE 12 may be fixed or may have a mobility, and may be interchangeably used with other terms, for example, a mobile station (MS), a mobile terminal (MT), a user terminal (UT), a subscriber station (SS), a wireless device, a personal digital assistant (PDA), a wireless modem, a handheld device, a connected car, a wearable device, and an Internet of Things (IoT) device.

Also, the BS 11 may be interchangeably used with various terms, for example, a megacell, a macrocell, a microcell, a picocell, and a femtocell, based on a size of coverage provided by a corresponding BS and/or whether to limit and authenticate a user accessible to the BS. A cell may be used as a term that indicates a frequency band provided from a corresponding BS, coverage of the BS, and a beam configured by an antenna of the BS, or the BS. Also, when a single UE is simultaneously connected to at least two BSs through dual connectivity, different terms may be used for the BSs based on a role of each BS as follows. For example, a BS capable of directly transmitting signaling for radio resource control (RRC) to the UE and controlling a mobility and a wireless connection, such as handover, may be referred to as a master eNodeB. A BS capable of providing an additional radio resource to the UE, partially independently controlling the radio resource and partially controlling the radio resource through the master eNodeB may be referred as a secondary eNodeB.

Hereinafter, a downlink (DL) represents a communication or a communication path from the BS 11 to the UE 12, and an uplink (UL) represents a communication or a communication path from the UE 12 to the BS 11. In the downlink, a transmitter may be a portion of the BS 11 and a receiver may be a portion of the UE 12. In the uplink, the transmitter may be a portion of the UE 12 and the receiver may be a portion of the BS 11.

In the meantime, a multiple access scheme applied to the wireless communication system 10 is not limited. For example, various multiple access schemes, such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, OFDM-CDMA, frequency hopping (FH)-CDMA, and FH-OFDMA. Also, a time division duplex (TDD) scheme of performing transmission using different time slots, a frequency division duplex (FDD) scheme of performing transmission using different frequencies, or a half-FDD scheme of performing transmission using different frequencies, and here, performing UL transmission and DL transmission in different time slots may be used for uplink (UL) transmission and downlink (DL) transmission.

Abbreviations used herein may be defined as follows:
RRC: Radio Resource Control
RAN: Radio Access Network
S-GW: Serving GateWay
S1-UP bearer: S1-User Plane bearer
gNB: g-NodeB (a name of a base station of a 5G mobile communication network, for example, an NR system, and used to be distinguished from an eNB of an LTE system)
eMBB: evolved Mobile BroadBand
URLLC: Ultra Reliability Low Latency Communication
mMTC: massive Machine Type Communication
HSS: Home Subscriber Server
s-TMSI: SAE-Temporary Mobile Subscriber Identity
SAE: System Architecture Evolution
IMSI: International Mobile Subscriber Identity
HO: HandOver
TA: Tracking Area
TAU: Tracking Area Update
RNA: RAN-based Notification Area
CP: Control Plane
PLMN: Public Land Mobile Network
MME: Mobility Management Entity Discussion on an NR system that is being studied as one of next generation mobile communication systems is ongoing. In the NR system, a new RRC mode may be set to support a case in which load of a communication service currently required by a UE is small or absent. The new RRC mode is hereinafter referred to as an RRC inactive mode. The scope of the present disclosure is not limited by such a name and includes a new RRC mode distinguished from an RRC connected mode and an RRC idle mode.

The RRC inactive mode may be set by a BS or a UE depending on whether load of a wireless communication service associated with the UE is present. Herein, an operation method of a network (e.g., network node(s) including the BS) and the UE to support a case in which the UE set to be in the RRC inactive mode migrates to another BS or cell within a network service area. Using the method according to the present disclosure, it is possible to maintain an RRC mode in which a service for a UE migrating in a network is smoothly supported.

Hereinafter, a handover method and a tracking area update (TAU) method are initially described and an RNA update method according to the present disclosure is described, to maintain a connection state between a UE having a mobility and a network by considering requirements of a next generation mobile communication system.

Different various types of services (e.g., realistic contents, a mobile hologram display, and a smart home service) required for the next generation mobile communication system may be largely classified into three service types, for example, eMBB, URLLC, and mMTC. Requirements to support the three service types may include various items. Even with respect to the same requirement item, different standards need to be applied based on a service type.

For example, with respect to a requirement item "latency", different standards may be applied in an eMBB service and an URLLC service. For example, with respect to latency occurring in a one-way communication between a second layer (layer 2) of a UE and a second layer (layer 2) of a BS based on a situation in which an error of 0.001% occurs, the eMBB service may require the latency of 4 ms or less and the URLLC service may require the latency of 0.5 ms or less.

To meet the various requirement standards, settings of a time and a frequency that are most basic units of a physical channel and a unit of a radio resource that is defined as a space may have an effect and signaling between the UE and the network to support a radio resource control and a mobility of the UE may have a great effect. Accordingly, a requirement standard, such as 5 ms, is defined based on a situation in which an error of 0.001% occurs with respect to reliability and latency in communication between control planes (CPs).

In an existing 4G wireless communication system, such as LTE, an RRC connected mode and an RRC idle mode are defined. The RRC connected mode is an RRC mode in which a wireless connection between the UE and the BS is maintained to support a voice call and wireless data service in real time. The RRC idle mode is an RRC mode for supporting a case in which the UE selects a PLMN and a cell and is camped on, including a state in which initial power-on of the UE is completed, or a case in which it is finally determined that the UE is out of a service area since an RRC connection is released by a network or the UE fails in finding a network signal in the RRC connected mode and accordingly, the UE determines to be unable to maintain the RRC connected mode.

A cell in which a UE is camped on or a cell in which the UE receives a data service in the RRC connected mode is defined as a serving cell of the UE. If it is determined that the UE may not maintain the data service through the serving cell based on a reference value regarding previous received signal strength from the service cell due to various reasons, such as migration of the UE in the RRC connected mode, the UE may determine to use the service through another cell. In this case, the UE may inform the serving cell that the UE desires to use the service through the other cell. Accordingly, a BS including the serving cell may need to guarantee a mobility of the UE to not interrupt quality of service (QoS) of the service that is supported for the UE in coordination with another BS including a cell that services an area to which the UE migrates.

To this end, in the case of handover of the UE, requirements that interruption of Oms needs to be supported for a specific service, such as an URLLC service, sensitive to latency are defined in the 5G mobile communication system.

Hereinafter, a method of supporting a mobility of a UE in an RRC connected mode is described.

Figure 2:
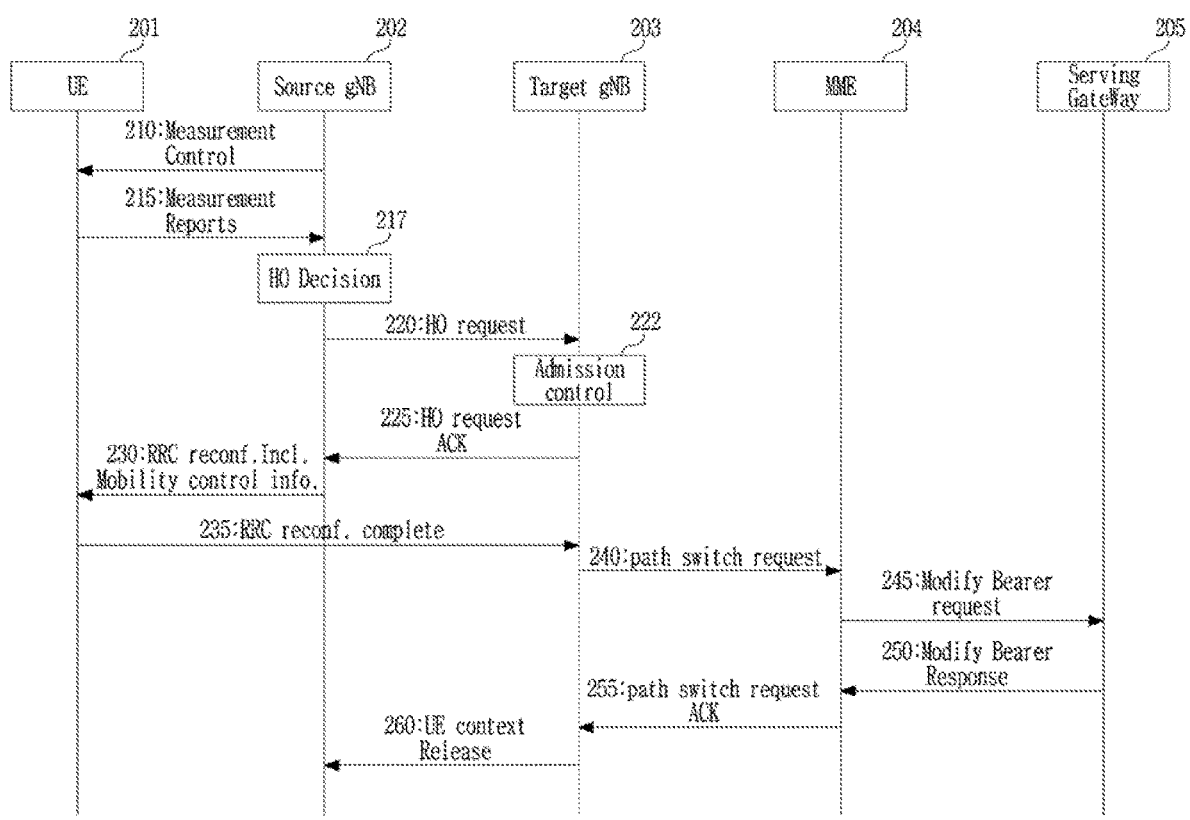
FIG. 2 illustrates an example of a handover procedure according to the present disclosure.

FIG. 2 illustrates an example of a handover procedure according to the present disclosure.

A case in which a UE 201 in an RRC connected mode with a source gNB 202 performs handover from the source gNB 202 to a target gNB 203 is described with reference to FIG. 2. This handover process may include signaling between a gNB and elements for example, an MME 204 and an S-GW 205, of a core network.

The MME 204 is an element configured to perform signaling and control functions to support access to network connection of the UE, allocation of a network resource, tracking, paging, roaming, handover, and the like. The MME may control CP functions associated with a subscriber and session management. The MME may manage a large number of gNBs and may perform functions of security procedures, terminal-to-network session handling, and idle terminal location management, and the like.

The S-GW 205 may operate as a boundary point between a radio access network (RAN) and a core network (CN) and may serve to maintain a data path between a gNB and a packet data network (PDN). Also, when the UE moves over a serving area of the gNB, the S-GW may perform a role of a local mobility anchor point.

In the example of FIG. 2, the UE 201 may receive control signaling from the source gNB 202 to perform measurement in operation 210, and may report a measurement result to the source gNB 202 in operation 215.

In operation 217, the source gNB 202 may determine whether to perform a handover (HO) based on the measurement result.

When the source gNB 202 determines that serving by another gNB is appropriate, such as a case in which a signal quality measurement result from the source gNB 202 that is a current serving gNB of the UE 201 is less than a desired reference value or a signal quality from another gNB, for example, the target gNB 203, is relatively higher, the source gNB 202 may transmit a handover (HO) request message to the target gNB 203 in operation 220. Accordingly, the target gNB 203 may perform admission control in operation 222 and may transmit an HO request acknowledgement (ACK) to the source gNB 202 in operation 225.

In operation 230, the source gNB 202 may transmit an RRC reconfiguration message to the UE 201. The RRC reconfiguration message may include mobility control information. In operation 235, in response thereto, the UE 201 may transmit an RRC reconfiguration complete message to the target gNB 203.

In operation 240, the target gNB 203 may transmit a path switch request message to the MME 204. In operation 245, the MME 204 may transmit a modify bearer request message to the S-GW 205. In operation 250, in response thereto, the S-GW 205 may transmit a modify bearer response message to the MME 204. In operation 255, the MME 204 may receive the same and may transmit a path switch request ACK to the target gNB 203.

According to the aforementioned handover (HO) decision, the UE 201 may complete an RRC reconfiguration with the new target gNB 203. Once the target gNB 203 completes a path switch and a bearer modification with respect to the MME 204 and the S-GW 205, the target gNB 203 may inform the source gNB 202 of UE context release in operation 260.

The aforementioned handover procedure requires operations 240, 245, 250, and 255 of switching a path of S1-UP bearer for data transmission in coordination with an element in an upper core network of a gNB, such as the S-GW 205. Also, the handover procedure requires signaling between base stations, for example, gNBs, to prevent loss of context information about a UE or data being serviced to the UE.

As described above, the handover procedure supporting the mobility of the RRC connected mode has an advantage in that it is possible to seamlessly provide maximum resources supportable in the system while minimizing a dysconnectivity time of a wireless communication service in the UE, and has a disadvantage in that great signaling load occurs in the network to support the mobility of the UE.

Hereinafter, a method of supporting a mobility of a UE in an RRC idle mode is described.

Although the UE in the RRC idle mode is not using a wireless communication service, the wireless communication service needs to be immediately initiated in response to a request for the wireless communication service from a counterpart UE that requires connection of a voice call or a data transmission and reception to the corresponding UE, in response to a request for the wireless communication service from a server within a network to the corresponding UE, or in response to a request for connection of a voice call or a data transmission and reception from a user using the UE in the RRC idle mode or an application program.

Among the aforementioned cases, when the wireless communication service is to be initiated by not the UE in the RRC idle mode or by an external apparatus, the network may transmit a paging signal to establish an RRC connection with the UE. However, the UE in the RRC idle mode may not transmit any signal to a gNB. Therefore, basically, when the UE in the RRC idle mode moves, the network may be unaware of a gNB to which the UE has currently moved. Accordingly, an apparatus that transmits paging to a UE in the network may merely need to transmit the paging signal for the UE to all of the gNBs present in the network and may request the gNBs to wirelessly transmit the paging signal. This requires huge network signaling load and radio resources. In addition, according to an increase in the number of UEs, signaling load may exponentially increase.

Accordingly, the concept of a tracking area (TA) is introduced to solve the aforementioned issues. The TA allows a paging signal to be transmitted only through a cell or a gNB within the TA. To this end, the UE (also, referred to as the RRC mode UE) in the RRC mode needs to inform the network of TA information about the TA in which the corresponding UE is positioned such that a paging signal transmitted to the UE may be forwarded thereto at all times. Therefore, while there is an advantage in that it is possible to reduce network signaling load occurring for paging transmission and use of radio resources, there is a disadvantage in that additional signaling between the UE and the network is required every time the UE migrates to another TA.

In detail, at least one cell or gNB is set as a single TA and the same TA identifier (ID) value is allocated to cells or gNBs included in the same TA. TA setting and ID allocation may be managed by an apparatus (e.g., MME) that transmits paging to the UE in the network.

Each gNB may include TA ID information set by the MME in system information (SI) and may broadcast the system information to UEs present in gNB coverage. Therefore, when the UE in the RRC idle mode changes a serving cell due to its movement, that is, when the UE is camped on a cell selected through a cell selection procedure, the UE may verify the TA ID in the system information transmitted by the serving cell and may determine whether a current location is identical to a TA of an old serving cell.

When it is determined that a TA of a corresponding serving cell is different from that of the old serving cell while the mode in the RRC idle mode changes the serving cell through the cell selection procedure, the UE may forward a request for updating the TA in which the UE is current positioned to an MME that controls a current serving cell through a tracking area update (TAU) procedure.

Figure 3:
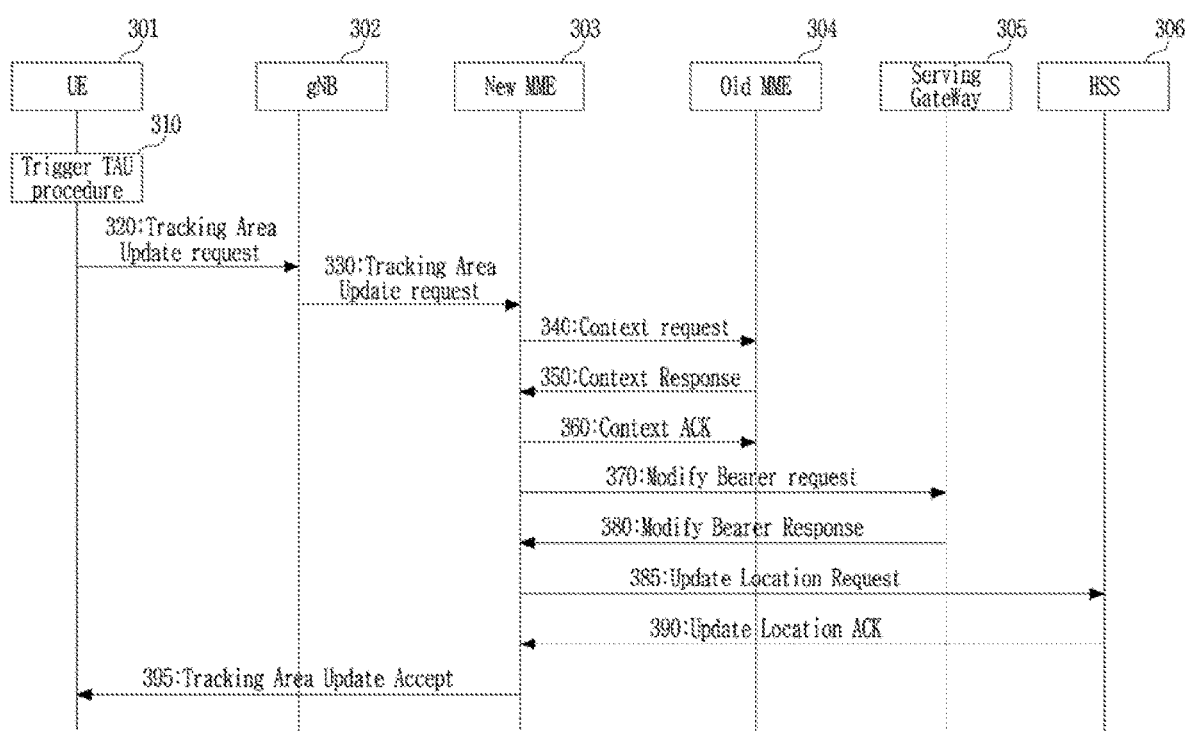
FIG. 3 illustrates an example of a tracking area update (TAU) procedure according to the present disclosure.

FIG. 3 illustrates an example of a TAU procedure according to the present disclosure.

Referring to FIG. 3, a UE 301 may change from an RRC idle state and may verify a TA ID received from a gNB 302 through system information (SI). When the verified TA ID is a new TA ID different from an old TA ID of the UE 301, the UE 301 may trigger a TAU procedure in operation 310.

In operation 320, the UE 301 may transmit a TAU request message. In operation 330, the gNB 302 may forward a TAU request message to a new MME 303. The new MME 303 may be an MME that manages the gNB 302, and may be different from an old MME 304 that manages gNBs belonging to an old TA of the UE.

In operation 340, the new MME 303 may request the old MME 304 for context information associated with the UE 301. In operation 350, in response thereto, the new MME 303 may receive context information from the old MME 304. In operation 360, in response thereto, the new MME 303 may transmit, to the old MME 304, ACK indicating that context information is received.

The new MME 303 may transmit a modify bearer request message to an S-GW 305 in operation 370, and, in response thereto, may receive a modify bearer response message from the S-GW 305 in operation 380.

The new MME 303 may transmit an update location request to an HSS 306 in operation 385, and, in response thereto, may receive an update location ACK from the HSS 306 in operation 390. Here, the HSS 306 may include a database that stores subscriber information in a 3GPP network, and may perform functions, for example, a configuration storage, an identity management, and a user state storage.

Once the new MME 303 receives UE context information and completes a bearer modification and a location update in response to the request from the UE 301, the new MME 303 may transmit a TAU accept message to the UE 301 in operation 395.

Although a UE desires to maintain a data service while minimizing latency as in an RRC connected mode, a currently actively ongoing service may be absent. In this case, if the UE maintains the RRC connected mode, handover may unavoidably occur due to a mobility of the UE. As described above with FIG. 2, although signaling load occurs due to handover, there may be no ongoing service with respect to the UE during a desired period of time. In this case, signaling load by proceeding handover procedures may cause waste of network resources in reality.

If the UE desires to maintain an RRC idle mode, the UE needs to enter into an RRC connected mode to use a service, which causes occurrence of long latency incapable of meeting QoS, signaling load between the UE and a gNB occurring every time a new RRC connection is established, and load between the gNB and a core network may occur. Also, a TAU procedure needs to proceed to support a mobility of the UE in the RRC idle mode. In this case, as described above with reference to FIG. 3, signaling load between the gNB and the core network additionally occurs.

Accordingly, to simplify a procedure on a control plane (CP) between the UE and the network, a new concept, a RAN-based notification area (RNA), is introduced herein. The purpose of the RNA is similar to the TA. That is, the RNA may correspond to a range in which a paging signal is transmitted to a single UE. A configuration of the RNA is similar to that of the TA. That is, the RNA may include at least one cell or gNB. However, the RNA is defined to support a mobility of the UE in the RRC inactive mode and is distinguished from the TA for supporting the mobility of the UE in the RRC idle mode. The RRC inactive mode has the following features:

A connection between a core network (CN) and an NR RAN is established for a UE.
  The connection between the CN and the NR RAN includes all of a connection on a CP and a connection on a user plane (UP).
An access stratum (AS) context of the UE is stored in at least one gNB and the UE. An AS corresponds to a functional stratum between a wireless network and the UE and is in charge of data transfer and radio resource management through a wireless connection.
Paging is initiated by the NR RAN.
The RNA is operated by the NR RAN.
The NR RAN is aware of the RNA to which the UE belongs.
When a mode changes from an RRC connected mode to an RRC inactive mode through an RRC inactivation of the gNB, all of component carriers (CCs) set and activated for the UE may be shifted to an inactive state or all of the set CCs may be released.

Here, cells or gNBs included in the RNA is configured in a list form, and may be included in system information and thereby provided to the UE in a broadcast form or may be provided to the UE through an RRC connection reconfiguration message in a state in which the UE shifts from the RRC inactive mode to the RRC connected mode. Here, information included in the list may be a cell ID defined in the NR system. For example, RNA information in the list form may include at least one cell ID information or gNB ID information in an RNA in which a cell in the gNB is included. Alternatively, the information may include at least one cell ID information or gNB ID information mapped to first RNA ID information, at least one cell ID information or gNB ID information mapped to second RNA ID information, and the like.

The UE may enter into the RRC inactive mode through the RRC inactivation procedure in the RRC connected mode. The UE may not directly enter into the RRC inactive mode in the RRC idle mode. Therefore, the UE in the RRC inactive mode maintains a configuration of a default bearer capable of mapping transmission and reception data regardless of a specific QoS setting in a plurality of pieces of configuration information that are configured through the RRC connection reconfiguration procedure in the RRC connected mode and a configuration of a data bearer (DRB) supportable in some RRC inactive modes.

Configurations of the bearers may be controlled by an anchor gNB that stores UE AS context of the UE. That is, bearer configuration information may be modified through a message within a paging channel transmitted from the anchor gNB, and serving cells within the RNA may be aware of and support bearer configuration information of the UE (also, referred to as the RRC inactive mode) in the RRC inactive mode.

That is, gNBs including serving cells in the RNA may forward data transmitted from the RRC inactive mode UE to the anchor gNB and may forward data forwarded from the anchor gNB to transmit to the RRC inactive mode UE through the configured bearer.

As another method, a cell or a gNB included in the RNA may provide the UE with an ID value of an RNA that includes each corresponding cell. The RNA ID value may be included in system information (SI) and thereby broadcasted. The UE may verify the RNA ID value and may verify the RNA to which the corresponding UE belongs.

Hereinafter, a method of supporting a mobility of a UE in an RRC inactive mode is described.

Figure 4:
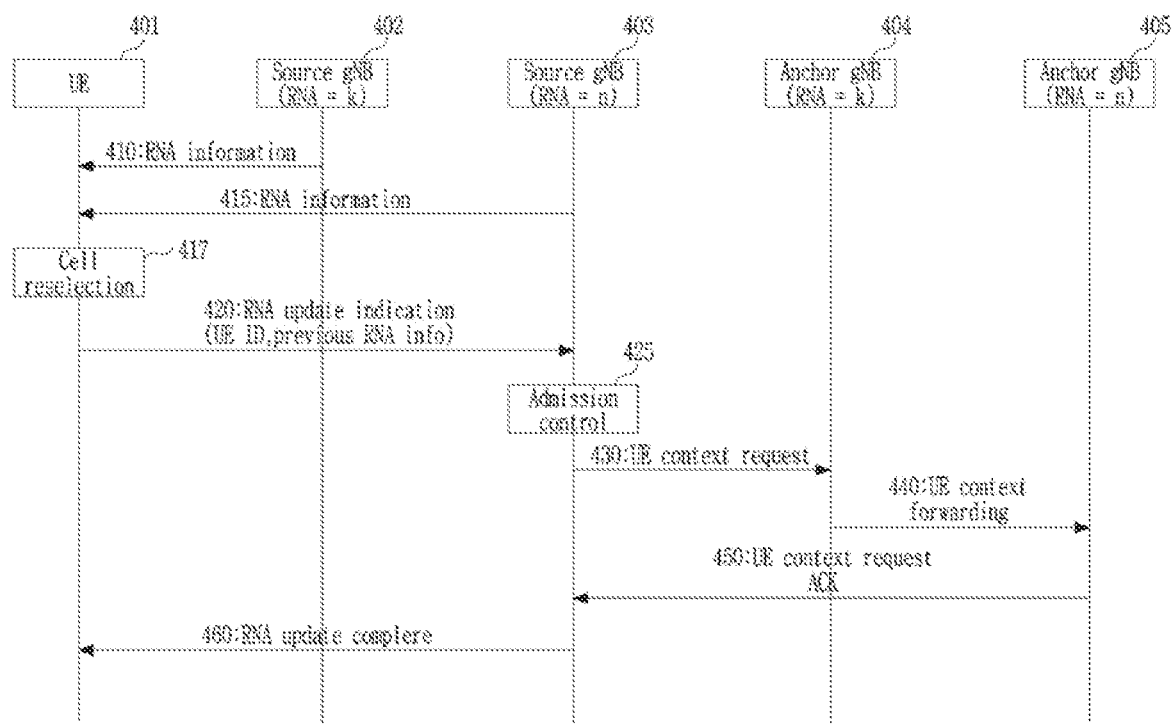
FIG. 4 illustrates an example of a radio access network-based notification area (RNA) update procedure according to the present disclosure.

FIG. 4 illustrates an example of a radio access network-based notification area (RNA) update procedure according to the present disclosure.

An example of supporting a mobility of a UE in an RRC inactive mode through an RNA update procedure between a UE 401 and an anchor gNB is described with reference to FIG. 4. Here, the term "anchor gNB" may correspond to a gNB that stores UE AS context.

Referring to FIG. 4, the UE 401 may move in an RRC inactive and receive RNA information from a source gNB 402 state in operation 410 and may receive RNA information from a target gNB 402 in operation 415. For example, the RNA information may be ID information of an RNA to which each gNB belongs. That is, the RAN information received in operation 410 may represent RNA ID=k and the RNA information received in operation 415 may represent RNA ID=n.

When the UE 401 receives the RNA information in a list form from the source gNB 402 in operation 410, the UE 401 may not receive the RNA information from the target gNB 403 in operation 415.

In response to migration of the UE 401, a cell reselection may be performed in operation 417. The UE 401 may verify RNA information of a reselected cell and may determine whether a cell included in an RNA different from a previous RNA of the UE 401 is reselected.

Hereinafter, the cell reselection procedure is described.

Initially, in the case of cell reselection, a UE may set priority of a cell to be reselected by considering accessibility based on radio access technology (RAT) of a cell to which the UE currently connects, whether a cell candidate to be selected is a closed subscribe group (CSG), and access class information of the UE.

Once the priority setting is completed, the UE determines a cell selectivity starting from a cell having highest priority. When all of the values acquired by subtracting a minimum requirement value and an offset value from the received signal values are over zero by considering a reference signal received power (RSRP) value and a reference signal received quality (RSRQ) value of a received signal of the selected candidate cell, an offset value set by a corresponding cell, and the like, the UE may determine the selected candidate cell as a selectable cell. Hereinafter, the UE may select the selectable cell and may complete the reselection procedure.

In the example of FIG. 4, it may be assumed that the UE 401 moves from an area of the source gNB 402 including a cell belonging to RNA ID=k and enters into the target gNB 403 including a cell belonging to RNA ID=n. In this case, the UE 401 may select the cell of the target gNB 403 through the cell reselection process in operation 417. The UE 401 may verify that a cell having a new RNA ID value, n, different from a previous RNA ID value, k, of the UE 401 is selected.

In this case, to inform the network that the cell belonging to the new RNA is reselected, the UE may transmit an RNA update indication message through the reselected cell in operation 420.

Here, the RNA update indication message transmitted in operation 420 may include a UE ID, previous RNA information, and the like.

Here, in operation 420, the RNA update indication message may be transmitted to the reselected cell through a random access procedure.

Figure 5:
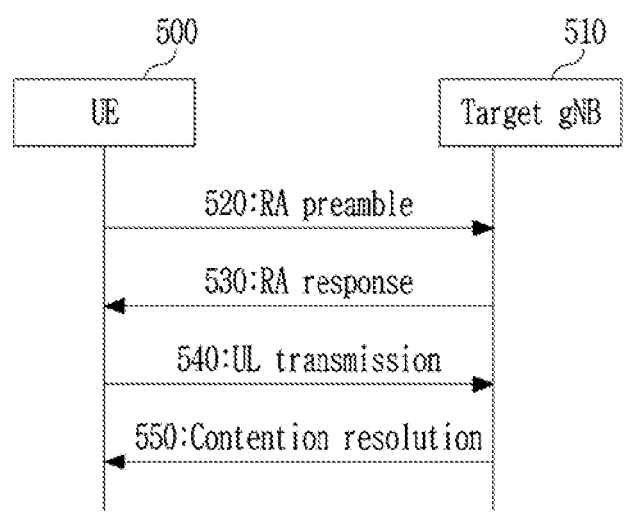
FIGS. 5 and 6 illustrate examples of a random access (RA) procedure according to the present disclosure.
Figure 6:
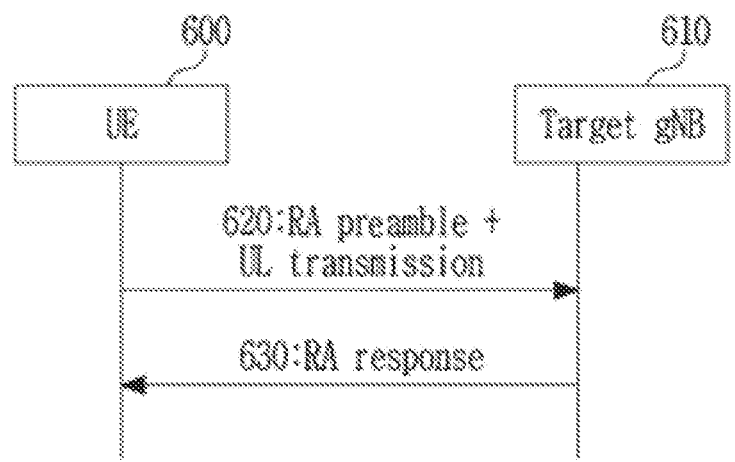

The random access procedure may proceed through a 4-step procedure of FIG. 5 or a 2-step procedure of FIG. 6. The random access procedure is a procedure performed for a UE to transmit a signal to a gNB when the UE initially accesses the gNB or when a radio resource for signal transmission is absent.

The 4-step procedure of FIG. 5 may be a contention based random access procedure. That is, in operation 520, a UE 500 may transmit, to a target gNB 510 as a random access (RA) preamble, a single sequence that is randomly selected by the UE 500 from a specific set through a physical random access channel (PRACH). In operation 530, in response thereto, the UE 500 may receive a response message to the RA preamble from the target gNB 510 through a physical downlink control channel (PDLCCH) and a physical downlink shared channel (PDLSCH) corresponding thereto. The response message of operation 530 may include an uplink (UL) grant that allocates a resource used for the UE 500 to perform UL transmission. Accordingly, in operation 540, the UE 500 may perform UL transmission with respect to the target gNB 510. In the contention based random access procedure of FIG. 5, a plurality of UEs may attempt to access a gNB using the same resource. Accordingly, a final contention resolution procedure may be performed in operation 550.

The 2-step procedure of FIG. 6 may be a non-contention based random access procedure. The non-contention based random access may be performed in response to a request during a handover process or an instruction of a gNB or during an RNA update procedure described in the present disclosure. That is, since an RA preamble transmitted from a UE 600 to a target gNB 610 corresponds to a sequence that is allocated to a specific UE, no collision with another UE may be predicted. Therefore, the UE 600 may simultaneously perform RA preamble and UL transmission with respect to the target gNB 610 in operation 620. In operation 630, in response thereto, the UE 600 may receive a response message to the RA preamble from the target gNB 610 through a physical downlink control channel (PDLCCH) and a physical downlink shared channel (PDLSCH) corresponding thereto. Through this, the random access procedure is completed and an additional contention resolution is not required.

Referring again to FIG. 4, in the case of transmitting the RNA update indication message to the target gNB 403 in operation 420 using the random access procedure, the RNA update indication message of operation 420 may be transmitted through an UL transmission process of operation 540 of FIG. 5 and may be transmitted through an UL transmission process of operation 620 of FIG. 6 with the RA preamble.

In operation 425, the target gNB 403 (i.e., a gNB including the cell reselected by the UE 401) may receive the RNA update indication message transmitted in operation 420 and may perform an admission control of determining whether to allow the UE 401 having transmitted the RNA update indication message in operation 420 to maintain the RRC inactive mode.

The target gNB 403 may determine whether to allow the UE 401 to maintain the RRC inactive mode by collectively considering states of the network and the UE 401. For example, when an amount of resources used to accommodate an additional RRC inactive mode UE is insufficient due to an excessive number of UEs set to be in the RRC inactive mode, or when it is determined that it is more efficient to reduce power consumption of a corresponding UE by shifting a state of the UE from the RRC inactive mode to the RRC idle mode, the target gNB 403 may not allow the UE 401 to maintain the RRC inactive mode. Otherwise, the target gNB 403 may allow the UE 401 to maintain the RRC inactive mode and may continuously proceed with RNA update.

When the target gNB 403 determines to accept the UE 401, the target gNB 403 may forward a request for forwarding AS context information of the UE 401 to the anchor gNB 404 in operation 430.

Here, the anchor gNB 404 may correspond to a gNB that stores UE context information in a previous RNA (e.g., RNA corresponding to RNA ID=k) of the UE 401.

Also, the UE context request of operation 430 may request an old gNB 405 to forward AS context information of the UE 401 to the anchor gNB 405 of a new RNA. Here, the new RNA may correspond to an RNA (i.e., an RNA corresponding to RNA ID=n) including a cell included in the target gNB 403, that is, a cell reselected by the UE 401.

In operation 440, the anchor gNB 404 may receive the UE context request transmitted in operation 430 and may forward UE AS context information to the anchor gNB 405 of the RNA (e.g., an RNA corresponding to RNA ID=n) including the target gNB 403.

In operation 450, the anchor gNB 405 may transmit, to the target gNB 403, a UE context request ACK informing that UE context information according to the request of the target gNB 403, that is, the UE context request transmitted in operation 430 is received.

If the target gNB 403 is identical to the anchor gNB 405, the anchor gNB 404 may forward the UE context information to the target gNB 403 in operation 440. In this case, operation 450 of transmitting the UE context request ACK message may be omitted.

Once UE context information is acquired from the new RNA in response to migration of the UE 401, the target gNB 403 may transmit, to the UE 401, an RNA update complete message informing that RNA update is successfully completed in operation 460.

Here, in operation 460, the RNA update complete message may be transmitted through a paging channel or through RRC signaling.

When the RNA update complete message is transmitted through the paging channel in operation 460, the RNA update complete message may include UE ID information and RNA update complete indication information.

For example, the UE ID information may include a UE ID included in the RNA update indication message of operation 420, radio network temporary ID (RNTI) information allocated by a gNB to a UE when setting an RRC inactive mode, or s-TMSI and IMSI information included in paging.

For example, the RNA update complete indication information may be included in a paging message in a form of field information indicating that an intent of corresponding paging information indicates completion of RNA update.

If the RNA update complete message is transmitted through RRC signaling in operation 460, such RRC signaling may be defined as a message that is transmitted from a gNB to a UE to inform RNA update completion during RNA update procedure. The RRC message may include a default bearer related parameter newly set to the UE or configuration information about an additional data radio bearer (DRB) and information about a logical channel corresponding thereto.

In the RNA update procedure, when the UE migrates from a current serving gNB or a first gNB storing UE AS context of the UE to a second gNB (i.e., a target gNB) belonging to a different RNA, the second gNB may not allow the UE to maintain an RRC inactive mode. For example, in operation 425 of performing admission control, the target gNB 403 may disallow the UE 401 to maintain the RRC inactive mode.

For example, if access barring information barring an access of a corresponding UE is included in system information (SI) transmitted from the second gNB, the second gNB may disallow the UE to maintain the RRC inactive mode.

In this case, whether an access class (AC) allocated to the UE corresponds to an access barring class may be determined. Alternatively, the UE may compare an access barring reference value (e.g., a value between 0 and 1) set by the second gNB included in the access barring information and a value that is randomly generated by the UE between 0 and 1, may determine that the access is allowed if the generated random value is greater than the reference value, and may attempt to access the second gNB. On the contrary, if the value generated by the UE is less than or equal to the reference value provided from the second gNB, the UE may not attempt the access or may stop or delay the access during a desired period of time and then may generate a random value again and determine the accessibility.

Also, when the second gNB receives an RNA update indication message from the UE and then transmits an RNA update reject message, the second gNB may disallow the UE to maintain the RRC inactive mode.

As described, when the second gNB disallows the UE to maintain the RRC inactive mode, the UE may change from the RRC inactive mode to the RRC idle mode.

Alternatively, in response to receiving the RNA update reject message, the UE may perform again a cell reselection procedure.

When the cell reselection procedure restarts, the UE may set a cell that has transmitted the RNA update reject message to a bottom priority and then proceed with the cell reselection procedure. When the cell reselection procedure is repeatedly performed, a timer based operation is defined to determine that it is difficult to maintain the RRC inactive mode. The timer starts when the cell reselection procedure initially starts and operates based on a predetermined value or during a preset period of time that is set through configuration information received by the UE in the RRC connected mode. When the timer expires, the UE determines that it is difficult to maintain the RRC inactive mode and enters into an RRC idle mode.

Figure 7:
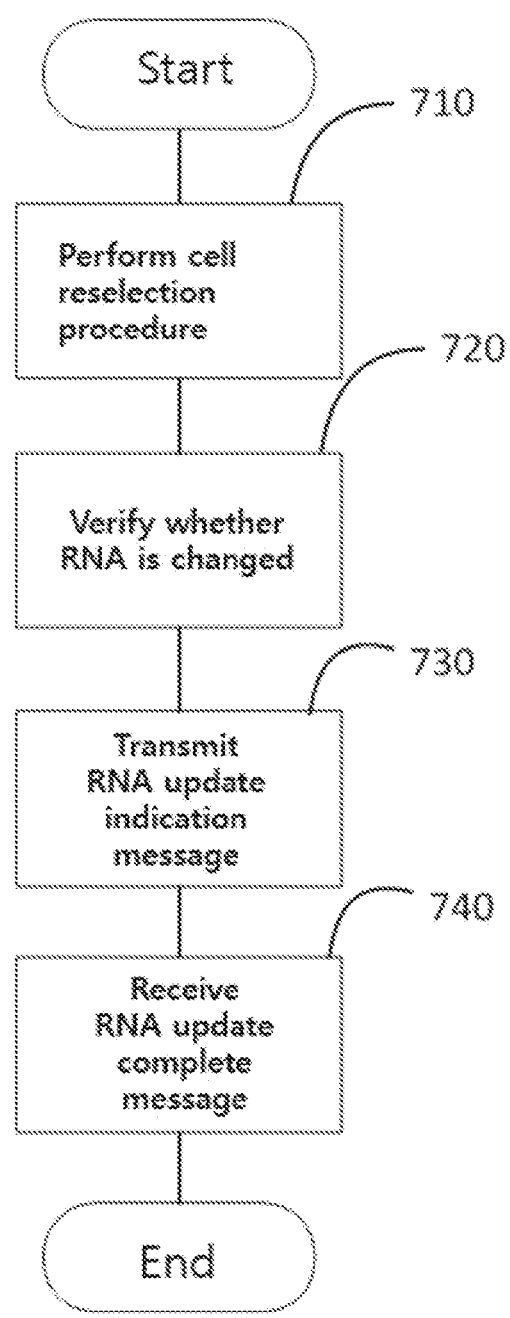
FIG. 7 is a flowchart illustrating an operation of a UE associated with an RNA update procedure according to the present disclosure.

FIG. 7 is a flowchart illustrating an operation of a UE associated with an RNA update procedure according to the present disclosure.

Referring to FIG. 7, in operation 710, a UE may perform a cell resection procedure based on a start condition of the cell reselection procedure, a reference value for selection, and the like.

Once the cell reselection procedure is completed, the UE may verify RNA information of a target gNB and may verify whether RNA information (i.e., a previous RNA) of a cell to which the UE currently belongs differs from an RNA to which a cell of the target gNB belongs in operation 720.

When the RNA of the cell (i.e., the cell reselected by the UE) included in the target gNB differs from the previous RNA of the UE, the UE may transmit an RNA update indication message to the target gNB in operation 730. When the RNA of the cell included in the target gNB is identical to the previous RNA, that is, when there is no change, RNA update may be omitted.

When the UE transmits the RNA update message, the UE may wait for receiving an RNA update complete message from the target gNB and may complete the RNA update procedure by receiving the RNA update complete message in operation 740.

Figure 8:
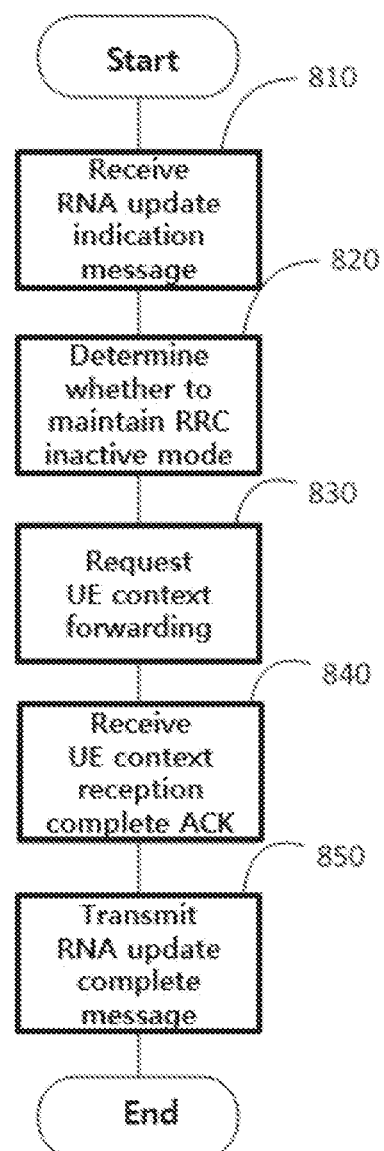
FIG. 8 is a flowchart illustrating an operation of a target base station associated with an RNA update procedure according to the present disclosure.

FIG. 8 is a flowchart illustrating an operation of a target gNB associated with an RNA update procedure according to the present disclosure.

Referring to FIG. 8, in operation 810, a target gNB may receive an RNA update indication message from a UE.

In this case, in operation 820, the target gNB may determine whether to allow the corresponding UE to maintain an RRC inactive mode by collectively considering states of a network and the UE.

If the target gNB determines to allow the corresponding UE to maintain the RRC inactive mode, the target gNB may transmit a message (i.e., a UE context forwarding request message) requesting to forward UE context to an anchor gNB of an RNA to which the target gNB belongs to an anchor gNB of a previous RNA of the UE in operation 830. If the target gNB determines to disallow the corresponding UE to maintain the RRC inactive mode, the target gNB may transmit a message indicating access barring or rejection of RNA update to the corresponding UE.

In operation 840, the target gNB having transmitted the UE context forwarding request message may receive an ACK message to the UE context reception complete from the anchor gNB of the RNA to which the target gNB belongs.

Accordingly, in operation 850, the target gNB may transmit, to the UE, a message indicating that RNA update is successfully completed.

Figure 9:
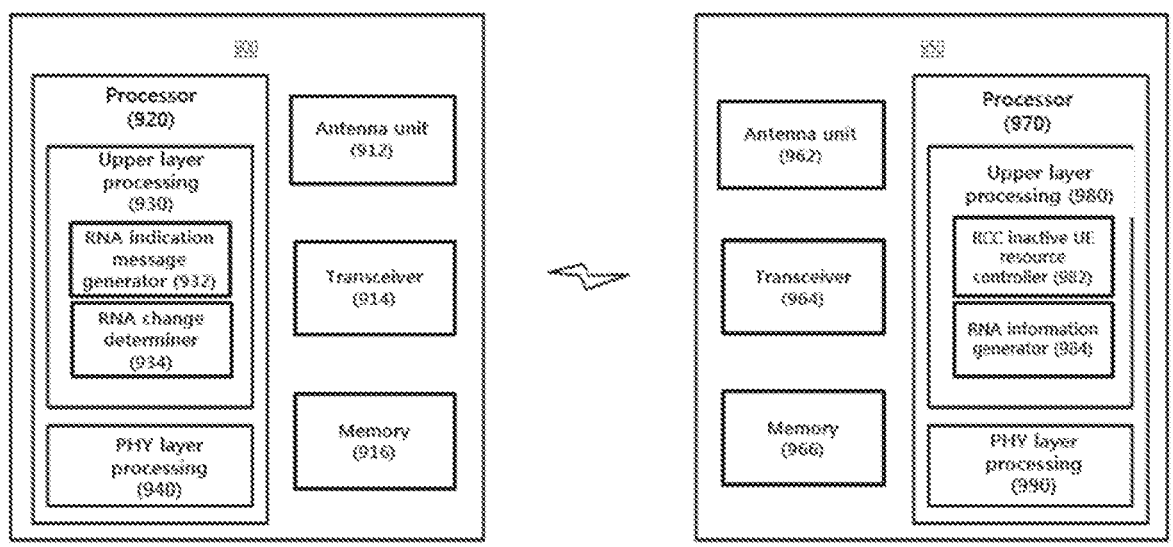
FIG. 9 is a diagram illustrating a configuration of a wireless device according to the present disclosure.

FIG. 9 is a diagram illustrating a configuration of a wireless device according to the present disclosure.

FIG. 9 illustrates a UE apparatus 900 configured to receive RNA information from a gNB apparatus 950 and to request the gNB apparatus 950 for RNA update and the gNB apparatus 950 configured to communicate with another gNB apparatus or a core network element to transmit the RNA information to the UE apparatus 900 and to process an RNA update request from the UE apparatus 900.

The UE apparatus 900 may include a processor 920, an antenna unit 912, a transceiver 914, and a memory 916.

The processor 920 may perform a baseband related signal processing and may include an upper layer processing 930 and a physical (PHY) layer processing 940. The upper layer processing 930 may process operations of a medium access control (MAC) layer, a radio resource control (RRC) layer, or a more upper layer thereof. The PHY layer processing 940 may process operations of a PHY layer (e.g., uplink (UL) transmission signal processing and downlink (DL) received signal processing). In addition to performing baseband related signal processing, the processor 920 may also control the overall operation of the UE apparatus 900.

The antenna unit 912 may include at least one physical antenna, and if the antenna unit 912 includes a plurality of antennas, may support multiple input multiple output (MIMO) transmission and reception. The transceiver 914 may include a radio frequency (RF) transmitter and an RF receiver. The memory 916 may store operation processed information of the processor 920, software, an OS, and an application associated with an operation of the UE apparatus 900, and the like, and may include components, for example, a buffer.

The processor 920 of the UE apparatus 900 may be set to configure a UE operation in the example embodiments described herein.

For example, the PHY layer processing 940 of the processor 920 of the UE apparatus 900 may configure a message (e.g., an RRC message) forwarded from the upper layer processing 930 to fit a data format, and may transmit the message to the gNB apparatus 950. Alternatively, when a message (e.g., an RRC message, a paging message, and an SI message) is received from the gNB apparatus 950, the PHY layer processing 940 may forward the received message to the upper layer processing 930.

The upper layer processing 930 of the processor 920 of the UE apparatus may include an RNA indication message generator 932 and an RNA change determiner 934.

The PHY layer processing 940 may forward the RNA information received from the gNB apparatus 950 to the RNA change determiner 932. The RNA information may include information about an RNA to which a serving cell of a UE belongs, information about an RNA to which a cell reselected by the UE belongs, and the like.

The RNA change determiner 934 may determine whether a previous RNA of the UE differs from an RNA of the reselected RNA and when it is determined that they are different, may forward a corresponding result to the RNA indication message generator 932.

The RNA indication message generator 932 may generate an RNA indication message based on information provided from the RNA change determiner 934 and may forward the RNA indication message to the PHY layer processing 940 to transmit to the gNB apparatus 950.

Also, the PHY layer processing 940 may forward an RNA complete message received from the gNB apparatus 950 to the upper layer processing 930.

According to the present disclosure, the processor 920 verifies whether the UE 900 is set to be in an RRC inactive mode and, if it is in the RRC inactive state, verifies whether to receive RNA information.

The RNA information may include a cell ID, a gNB ID, RNA ID information, and a mapping relationship therebetween, and may be received by the UE apparatus 900 through SI signaling or an RRC connection reconfiguration message.

Also, the processor 920 verifies whether previous RNA information is identical to newly received RNA information. When the previous RNA information differs from the newly received RNA information, the processor 920 determines to configure and transmit an RNA update indication message.

If the RNA update indication message is transmitted and then an RNA update reject message is received from the gNB 950, the processor 920 may perform again a cell reselection procedure. In this case, the processor 920 may set a cell that has transmitted the RNA update reject message to a bottom priority and then proceed with the cell reselection procedure. A predetermined timer may start when the cell reselection procedure initially starts. When the timer expires, the processor 920 may determine that it is difficult to maintain the RRC inactive mode and may enter into an RRC idle mode.

For example, the memory 916 may store RNA information, cell related information for cell section, and the like according to the present disclosure.

Meanwhile, the gNB apparatus 950 may include a processor 970, an antenna unit 962, a transceiver 964, and a memory 966.

The processor 970 may perform a baseband related signal processing and may include an upper layer processing 980 and a PHY layer processing 990. The upper layer processing 980 may process operations of a MAC layer, an RRC layer, or a more upper layer thereof. The PHY layer processing 990 may process operations of a PHY layer (e.g., DL transmission signal processing and UL received signal processing). In addition to performing baseband related signal processing, the processor 970 may also control the overall operation of the gNB apparatus 950.

The antenna unit 962 may include at least one physical antenna and, if the antenna unit 962 includes a plurality of antennas, may support MIMO transmission and reception. The transceiver 964 may include an RF transmitter and an RF receiver. The memory 966 may store operation processed information of the processor 970, software, an OS, and an application associated with an operation of the gNB apparatus 950, and may include components, for example, a buffer. The processor 970 of the gNB apparatus 950 may be set to configure a gNB operation in the example embodiments described herein.

For example, the PHY layer processing 990 of the processor 970 of the gNB apparatus 950 may configure a message (e.g., an RRC message, a paging message, and an SI message) forwarded from the upper layer processing 980 to fit a data format, and may transmit the message to the UE apparatus 900. Alternatively, when a message (e.g., for example, an RRC message) is received from the UE apparatus 900, the PHY layer processing 990 may forward the message to the upper layer processing 980.

Also, the upper layer processing 980 of the processor 970 of the gNB apparatus 950 may include an RRC inactive mode resource controller 982 and an RNA information generator 984.

The RNA information generator 984 may forward information about an RNA of the gNB apparatus 950 to the PHY layer processing 990 based on a system information (SI) transmission message, RRC signaling, or a paging message, and the like. The PHY layer processing 990 may configure the RNA information forwarded from the RNA information generator 984 to fit the data information format and may transmit the RNA information to the UE apparatus 900.

The PHY layer processing 990 may forward the RNA update indication message received from the UE apparatus 900 to the RRC inactive UE resource controller 982. The RRC inactive UE resource controller 982 may determine whether to allow a corresponding UE to maintain the RRC inactive mode by collectively considering a current required service of the UE and network load, and the like.

When it is determined to allow the UE to maintain the RRC inactive mode, the RRC inactive UE resource controller 982 may transmit a UE context request message to an anchor gNB of a previous RNA of the corresponding UE.

When an ACK message indicating that the UE context request is successfully performed is received from the anchor gNB, the PHY layer processing 990 may forward the ACK message to the RRC inactive UE resource controller 982.

Once the ACK message to the UE context request is received, the RRC inactive UE resource controller 982 may generate an RNA complete message and may forward the generated RNA complete message to the PHY layer processing 990. The PHY layer processing 990 may configure the RNA complete message to fit a data information format and may transmit the RNA complete message to the UE apparatus 900.

According to the present disclosure, the processor 970 may transmit the RNA information to the UE apparatus 900 set to be in the RRC inactive mode.

The RNA information may include a cell ID, a gNB ID, RNA ID information, and a mapping relationship therebetween, and may be transmitted by the gNB apparatus 950 through SI signaling or the RRC connection reconfiguration message.

When an RNA update indication message is received from the UE apparatus 900, the processor 970 may determine whether to allow the UE to maintain an RRC inactive mode. If it is determined to disallow the UE to maintain the RRC inactive mode, the processor 970 may transmit an RNA update reject message to the UE apparatus 900. Accordingly, the UE apparatus 900 may change from the RRC inactive mode to the RRC idle mode.

For example, the memory 966 may store RNA information, information included in the RNA update indication message and thereby received, UE context information, and the like.

Example methods of the present disclosure are represented as series of operations for clarity of description and are not construed to limit sequences of operations. If necessary, the respective operations may be performed simultaneously or in different order. To implement the method according to the present disclosure, another operation may be additionally included in the example operations. Alternatively, remaining operations excluding some operations may be included. Alternatively, an additional operation may be included with exception of some operations.

Various example embodiments of the present disclosure do not include all of possible combinations and are simply provided to explain representative aspects of the present disclosure. Descriptions made in various example embodiment may apply independently or in combination of two or more.

Also, various example embodiments of the present disclosure may be configured through hardware, firmware, software, or combination thereof. In the case of configuration by hardware, the example embodiments may be configured by one or more application specific integrated circuits (ASICs), digital signal processors (DSPs), digital signal processing devices (DSPDs), programmable logic devices (PLDs), field programmable gate arrays (FPGAs), general processors, controllers, micro controllers, microprocessors, and the like.

The scope of the present disclosure includes software or machine-executable instructions (e.g., OS, application, firmware, program, etc.) such that an operation according to the method of various example embodiments may be executed on an apparatus or a computer, and a non-transitory computer-readable medium storing such software or instruction to be executable on the apparatus or the computer.

INDUSTRIAL APPLICABILITY

The aforementioned description may apply to various wireless communication systems including another system such as an IEEE system as well as an 3GPP LTE, LTE-A, and an NR system.

What is claimed is:
1. A wireless user device comprising:
  at least one antenna to transmit and receive one or more wireless signals;
  at least one processor; and
  memory storing instructions that, when executed by the at least one processor, cause the wireless user device to:
    receive first radio access network-based notification area (RNA) information, wherein the wireless user device is in a radio resource control (RRC) inactive mode;
    receive, from a base station:
      second RNA information different from the first RNA information; and
      an access barring threshold value;
    based on a difference between the first RNA information and the second RNA information and based on the access barring threshold value, determine that an RNA update indication is allowed;

transmit, to the base station and based on determining that the RNA update indication is allowed, an RNA update indication message;

receive an RNA update reject message responsive to the RNA update indication message; and after receiving the RNA update reject message and while a timer is running, start a cell reselection.

2. The wireless user device of claim 1, wherein the instructions, when executed by the at least one processor, cause the wireless user device to transit, based on expiration of the timer, from the RRC inactive mode to an RRC idle mode.

3. The wireless user device of claim 1, wherein the instructions, when executed by the at least one processor, cause the wireless user device to monitor for an RNA update complete message that causes the wireless user device to maintain the RRC inactive mode.

4. The wireless user device of claim 1, wherein the second RNA information comprises at least one of:
 a cell list;
 a base station list;
 a cell identifier; or
 a base station identifier.

5. The wireless user device of claim 1, wherein the second RNA information is comprised in system information broadcasted from the base station.

6. The wireless user device of claim 1, wherein the RNA update indication message is transmitted via a random access procedure.

7. The wireless user device of claim 1, wherein the instructions, when executed by the at least one processor, cause the wireless user device to determine that the RNA update indication is allowed by:
 determining, based on a comparison of the access barring threshold value and a random value, that the RNA update indication is allowed.

8. A base station comprising:
 at least one antenna to transmit and receive one or more wireless signals;
 at least one processor; and
 memory storing instructions that, when executed by the at least one processor, cause the base station to:
  transmit, to a wireless user device:
   radio access network-based notification area (RNA) information; and
   an access barring threshold value, wherein the wireless user device is in a radio resource control (RRC) inactive mode, and wherein the access barring threshold value is associated with a determination that an RNA update indication is allowed;
  after transmitting the RNA information, receive, from the wireless user device, an RNA update indication message, wherein the RNA update indication message is based on:
   the RNA information; and
   the access barring threshold value;
  based on the RNA update indication message, determine whether to maintain the RRC inactive mode for the wireless user device; and
  perform, by the base station:
   based on a determination to maintain the RRC inactive mode for the wireless user device, transmission, to a node, a request for forwarding context information of the wireless user device; or
   based on a determination to not maintain the RRC inactive mode for the wireless user device, transmission, to the wireless user device, an RNA update reject message.

9. The base station of claim 8, wherein the instructions, when executed by the at least one processor, cause the base station to transmit the RNA update reject message to cause the wireless user device to transit from the RRC inactive mode to start a cell reselection while a timer is running.

10. The base station of claim 8, wherein the instructions, when executed by the at least one processor, cause the base station to transmit the RNA update reject message to cause the wireless user device to transit, based on expiration of a timer, from the RRC inactive mode to an RRC idle mode.

11. The base station of claim 8, wherein the instructions, when executed by the at least one processor, cause the base station to:
 after transmission of the request for forwarding context information of the wireless user device, transmit, to the wireless user device, an RNA update complete message.

12. The base station of claim 11, wherein the instructions, when executed by the at least one processor, cause the base station to transmit the RNA update complete message to cause the wireless user device to maintain the RRC inactive mode.

13. The base station of claim 8, wherein the RNA information comprises at least one of:
 a cell list;
 a base station list;
 a cell identifier; or
 a base station identifier.

14. The base station of claim 8, wherein the RNA information is comprised in system information broadcasted from the base station.

15. The base station of claim 8, wherein the node is comprised in a previous RNA associated with the wireless user device.

16. The base station of claim 8, wherein the node comprises a second base station that stores the context information of the wireless user device.

17. The base station of claim 8, wherein the RNA update indication message is received via a random access procedure.

18. The base station of claim 8, wherein the instructions, when executed by the at least one processor, cause the base station to determine, based on a comparison of the access barring threshold value and a random value, that the RNA update indication is allowed.

* * * * *